United States Patent [19]
Kato

[11] Patent Number: 5,682,282
[45] Date of Patent: Oct. 28, 1997

[54] HEAD FEEDING DEVICE INCLUDING A SCREW SHAFT PROVIDED WITH A PAIR OF GROOVES WITH ONE GROOVE BEING PROVIDED WITH A LUBRICANT

[75] Inventor: Kazunari Kato, Ishimori Iwaki, Japan

[73] Assignee: Alpine Electronics, Inc., Tokyo, Japan

[21] Appl. No.: 723,663

[22] Filed: Oct. 4, 1996

[30] Foreign Application Priority Data

Nov. 9, 1995 [JP] Japan ................... 7-290962

[51] Int. Cl.$^6$ ................................ G11B 5/55
[52] U.S. Cl. ........................ 360/106; 369/223
[58] Field of Search .................. 360/105, 106, 360/107, 109; 369/223

[56] References Cited

U.S. PATENT DOCUMENTS

| | | | |
|---|---|---|---|
| 3,921,969 | 11/1975 | Hickey et al. | 271/3.14 |
| 3,969,768 | 7/1976 | Ebbing | 360/107 |
| 4,071,866 | 1/1978 | Butsch | 360/106 |
| 4,848,174 | 7/1989 | Brown et al. | 74/89.15 |
| 5,063,557 | 11/1991 | Takamatsu et al. | 369/219 |
| 5,414,578 | 5/1995 | Lian et al. | 360/106 |
| 5,535,076 | 7/1996 | Kamioka et al. | 360/106 |

*Primary Examiner*—Jefferson Evans
*Attorney, Agent, or Firm*—Guy W. Shoup; Patrick T. Bever

[57] ABSTRACT

A head feeding device includes a screw shaft having a thread groove formed with a predetermined pitch, a driver for turning the screw shaft, a head guided in the axial direction of the screw shaft by a shaft bearing sliding on a surface of the screw shaft, and an engagement member that engages in the thread groove of the screw shaft and converts the turning force of the screw shaft into the axial head moving force. A second groove for containing a lubricant is formed on the screw shaft having the same pitch as that of the thread groove. The second groove retains lubricant scraped out of the thread groove by the engagement member. Therefore, lubricant is reliably supplied to the sliding surfaces between the screw shaft and the shaft bearing, thereby eliminating problems caused by increased friction or seizure, and thereby improving the head feeding accuracy.

17 Claims, 5 Drawing Sheets

HEAD FEEDING DEVICE INCLUDING A SCREW SHAFT PROVIDED WITH A PAIR OF GROOVES WITH ONE GROOVE BEING PROVIDED WITH A LUBRICANT

BACKGROUND OF THE INVENTION

1. Field of the Invention

The present invention relates generally to a head feeding (positioning) device in a disk drive apparatus which reads and/or writes signals from/onto an information bearing disk such as an optical disk (for example, a compact disk, mini-disk or a CD-ROM), a magnetooptical disk or a magnetic disk. More particularly, the present invention relates to a head feeding device that improves a head feeding accuracy by effectively supplying a lubricant onto a guiding surface of a screw shaft which is used for positioning the head over a selected portion of the information bearing disk.

2. Description of the Background Art

FIG. 3 and 4 are partially exploded perspective views showing head feeding devices used in conventional optical disk drive apparatus.

The head feeding device shown in FIG. 3 guides an optical head 2 having an objective lens 3 by means of two guide shafts 8a and 8b. Shaft bearing holes 5a, 6a are formed as a guiding reference on a head base 4 under the optical head 2, and the guide shaft 8a is inserted through the shaft bearing holes 5a, 6a. On the opposite side of the head base 4, a U-shaped recess 7a is formed which is movably supported on the guide shaft 8b with a small amount of horizontal play.

A screw shaft 11 is disposed in parallel to the guide shaft 8a, and serves as the feeding reference of the head. A turning force of a tracking motor 12 is decelerated by a reduction gear train 13 before being transmitted to the screw shaft 11, thereby driving the screw shaft 11 to turn in the α and β directions. The head base 4 is provided with an engagement recess 4a having an external thread (not shown) which is engaged to a thread groove of the screw shaft 11.

As the screw shaft 11 turns in the α or β directions, this turning force is applied to the engagement recess 4a as a feeding force in the (A) or (B) direction, thereby moving (feeding) the head base 4 and the optical head 2 in the (A)—(B) directions, wherein the guide shaft 8a serves as the reference.

However, the head feeding device shown in FIG. 3 is provided with three shafts, i.e., a pair of the guide shafts 8a, 8b and a screw shaft 11 in parallel thereto. Therefore, the head feeding device not only requires numerous components which increases production costs, but also requires a wider (horizontal) area within the disk drive apparatus to dispose these three shafts, thereby reducing the amount of space in which to dispose other components of the disk drive apparatus and preventing miniaturization of the disk drive apparatus.

Consequently, to reduce the area occupied by the guide shafts of the head feeding device, a second conventional embodiment shown in FIG. 4 uses a screw shaft to serve both as the guide shaft and as the guidance reference, thereby eliminating the guide shaft 8a of the first conventional embodiment shown in FIG. 3.

Referring to FIG. 4, the feeding device shown in FIG. 4, a guide shaft 8 is fixedly held by shaft supporting members 15, 15 which are, for example, fixed on a chassis of the disk drive apparatus. A screw shaft 1 is rotatably supported by shaft bearing members 10a and 10b which are also fixed on the chassis or the like.

Shaft bearings 5, 6 and 7 are provided on a head base 4 underlying an optical head 2. Shaft bearing holes 5a, 6a, which serve as the guidance reference of the optical head 2, are formed on the shaft bearings 5, 6, and a U-shaped recess 7a is formed on a portion of the shaft bearing 7 which is facing away from the optical head 2. The screw shaft 1 is inserted through the shaft bearing holes 5a, 6a, and the U-shaped recess 7a is movably supported on a guide shaft 8. Therefore, the optical head 2 is guided in the (A)—(B) direction, wherein a guidance surface 1a (shown in FIG. 5B) of the screw shaft 1 serves as the movement reference of the head 2.

A turning force of a tracking motor 12 is transmitted to a follower gear 14 fixed on the screw shaft 1 via a reduction gear train 13, thereby driving (rotating) the screw shaft 1.

FIG. 5A is an enlarged side view taken along line VA—VA in FIG. 4, and FIG. 5B is an enlarged plan view having a partial section as viewed along the Z-axis direction in FIG. 4.

As shown in FIG. 4, 5A, and 5B, an engagement member 9 is attached onto the shaft bearings 5, 6 of the head base 4 with a flat spring 16 by screws 17, 17. The engagement member 9 is formed of a synthetic resin, and includes an external thread 9a engaged in thread groove 1b of the screw shaft 1. A pressing member 16a is formed by bending the flat spring 16, and this pressing member 16a presses the external thread 9a of the engagement member 9 in the direction C such that the external thread 9a engages in the thread groove 1b.

When the screw shaft 1 is driven to turn in the α or β directions by the tracking motor 12, force is transmitted to feed the external thread 9a of the engagement member 9, thereby moving the optical head 2 and the head base 4 in the (A)—(B) directions. A portion on the surface of the screw shaft 1 where the thread groove 1b is not formed is used as a guidance surface 1a which slide against the bearing holes 5a, 6a.

Because the head feeding device shown in FIG. 4, 5A, and 5B only requires two shafts to support and guide the head base 4, the device of the second conventional embodiment has a reduced number of components and occupies less space in a disk drive apparatus, as compared to the head feeding device according to the first conventional embodiment shown in FIG. 3. Consequently, the head feeding device of the second conventional embodiment facilitates miniaturization of the disk drive apparatus.

However, in the head feeding device shown in FIG. 4, 5A, and 5B, as the bearing holes 5a, 6a slide against the guidance surface 1a of the screw shaft 1, the head base 4 moves in the (A)—(B) directions. Therefore, a lubricant, such as grease, is necessarily applied on the surface of the screw shaft 1 in order to reduce friction and prevent seizure (freezing) between the inner surface of the shaft bearing holes 5a, 6a and the guidance surface 1a of the screw shaft 1.

However, since the external thread 9a of the engagement member 9 is always engaged in the thread groove 1b formed on the screw shaft 1, the turning of the screw shaft 1 causes the external thread 9a to function so as to rake (scrape) the lubricant out of the thread groove 1b. As the screw shaft 1 turns in α direction, the lubricant collects in an area identified by reference numeral 100 in FIG. 5A, and as the screw shaft 1 turns in β direction, the lubricant collects in an area identified by reference numeral 200. Further, as the optical head 2 moves in the (A) direction, the lubricant is pushed out to collect in an area identified by reference numeral 300 in FIG. 5B, and as the head moves in the (B) direction, the lubricant collects in an area identified by reference numeral 400. Therefore, after prolonged operation, very little lubricant exists at the boundaries (contact points) between the inner surface of the shaft bearing holes 5a, 6a and the guidance surface 1a of the screw shaft 1.

In apparatus performing a high-speed access, such as a CD-ROM disk drive apparatus, the head feeding speed is important for high-speed information retrieval. However, high speed information retrieval is impaired as lubricant is removed from the boundaries between the inner surface of the shaft bearing holes 5a, 6a over a period of prolonged operation due to high frictional forces, and seizure between these boundary surfaces can occur.

Further, in the head feeding device shown in FIG. 4, 5A, and 5B, the screw shaft 1 serves as the guidance reference to which the optical head 2 moves in the (A)—(B) direction. Therefore, the straightness of the screw shaft 1 influences the feeding accuracy of the optical head 2. However, when the screw shaft 1 is pressed while the thread groove 1b is formed by a cutting tool or the like, the screw shaft 1 is apt to bend (deform). Therefore, the screw shaft 1 is inevitably curved in comparison to the guide shaft 8a which serves as the guidance reference for the head feeding device of the first conventional embodiment shown in FIG. 3. Therefore, although the head feeding device according to the second conventional embodiment occupies less space, the head feeding accuracy of the second conventional embodiment is less than that of the first conventional embodiment.

SUMMARY OF THE INVENTION

It is therefore an object of the present invention, in view of the foregoing problems of the conventional devices, to provide a head feeding device for positioning a head in a disk drive apparatus such that the head is positioned adjacent a desired portion of an information bearing disk, in which a screw shaft guides movement of a head, wherein the head feeding device positions the head with a high accuracy by supplying a lubricant effectively between the screw shaft and shaft bearing holes formed in a head base supporting the head.

It is another object of the present invention to prevent the head guidance accuracy from degrading by maintaining the straightness of the screw shaft.

In order to accomplish the foregoing objects, a head feeding device according to the present invention includes a screw shaft having a thread groove with a predetermined pitch, a drive mechanism for turning the screw shaft, a head guided by a shaft bearing which slides on the surface of the screw shaft, and an engagement member, engaging in the thread groove, for converting a turning force of the screw shaft into axial movement of the head, wherein the head feeding device includes at least one groove for containing a lubricant which is formed such that a segment of the lubricant groove is located between adjacent segments of the thread groove. The groove for containing a lubricant is preferably formed with a width which is narrower than that of the thread groove.

In accordance with another aspect of the present invention, the shaft bearing is formed on the head or on a head base supporting the head, and the shaft bearing slides on the screw shaft, thereby guiding the head along the screw shaft which serves as a movement reference. The head is either an optical head for optical disks or magnetooptical disks, or a magnetic head for magnetic disks.

The head is guided such that the shaft bearing, which is located on one side of the head, slides on the screw shaft, thereby using the screw shaft as a reference, and a shaft bearing on the other side of the head slides on a guiding member which is arranged in parallel to the screw shaft. This guiding member is, for example, a guide shaft provided in parallel to the screw shaft, or a guide plate or a part of the chassis formed in parallel to the screw shaft.

The engagement member engages in the thread groove formed on the screw shaft. This engagement member has, for example, an external thread or projections which engage in the thread groove, and is preferably pressed onto the thread groove by a flat spring or the like. In addition, as the driver drives the screw shaft to turn, a feeding force is transmitted to the head via the engagement member. This engagement member is attached onto the head or head base.

The thread groove is formed spirally with a predetermined pitch on the screw shaft, and at least one groove for containing a lubricant is formed on the screw shaft adjacent the thread groove such that a segment of the lubricant groove is located between adjacent segments of the thread groove. This groove for containing a lubricant is designed such that the external thread or the projections of the engagement member do not engage therein. Therefore, the groove is exclusively used for containing lubricant, and the lubricant contained in the groove cannot be raked (scraped) out by the external thread or the projections of the engagement member. Therefore, the lubricant is always supplied in an appropriate quantity between the inner surface of the shaft bearing and the guidance surface of the surface of the screw shaft, thereby preventing high frictional forces and/or seizure between the shaft bearing and the screw shaft.

If the thread groove of the screw shaft and the groove for containing a lubricant are designed to be identical in shape, depth, and width, then a general double-start threaded shaft can be used for the screw shaft. Namely, when a double-start threaded shaft is used for the screw shaft, one thread of the groove is used for the thread groove for feeding the head, in which the engagement member engages, and the other thread of the groove can be used exclusively as the groove for containing a lubricant, in which the engagement member does not engage. However, by forming the lubricant groove such that it is narrower than the thread groove, a larger portion of the outer surface of the screw shaft can be used as a guidance surface, thereby widening the contact area between the shaft bearing and the screw shaft, and stabilizing the operation of the screw shaft for guiding the head.

Furthermore, since there are two or more grooves formed on the screw shaft, a first cutting tool for cutting the thread groove and a second cutting tool for cutting the lubricant groove can be pressed from sides against the screw shaft, and in this state the grooves can be made by turning the shaft. Since the pressures by the cutting tools on opposite sides of the shaft are applied in opposing directions, minimal bending force is applied to the screw shaft during the groove cutting process, thereby producing a screw shaft having a high degree of straightness. Because the screw shaft is used as the guiding reference for the head movement, improving the straightness of the screw shaft over the single groove screw shaft of the prior art improves the accuracy of the head movement.

As described above, the head feeding device according to the present invention effectively supplies lubricant between the shaft bearing and the screw shaft, and the screw shaft has a relatively high degree of straightness when compared to the conventional examples (discussed above). Therefore, the head feeding device according to the present invention enables a reliable high-speed feeding of the head, and it improves the movement performance of the head in a high-speed or double-speed search by widening the pitch of the thread groove of the screw shaft in a CD-ROM drive or the like.

BRIEF DESCRIPTION OF THE DRAWINGS

The present invention will be fully understood from the detailed description provided below and from the accompanying drawings, which are provided for explanatory purposes and are not intended to limit the appended claims, of which:

FIG. 2A is an enlarged section taken along line IIA—IIA in FIG. 1, and FIG. 2B is an enlarged plan view including a partial section as viewed from the Z direction in FIG. 1;

FIG. 5A is an enlarged section taken along the line VA—VA in FIG. 4, and FIG. 5B is an enlarged plan view including a partial section as viewed from the Z direction in FIG. 4.

DESCRIPTION OF THE PREFERRED EMBODIMENT

Figure 1:
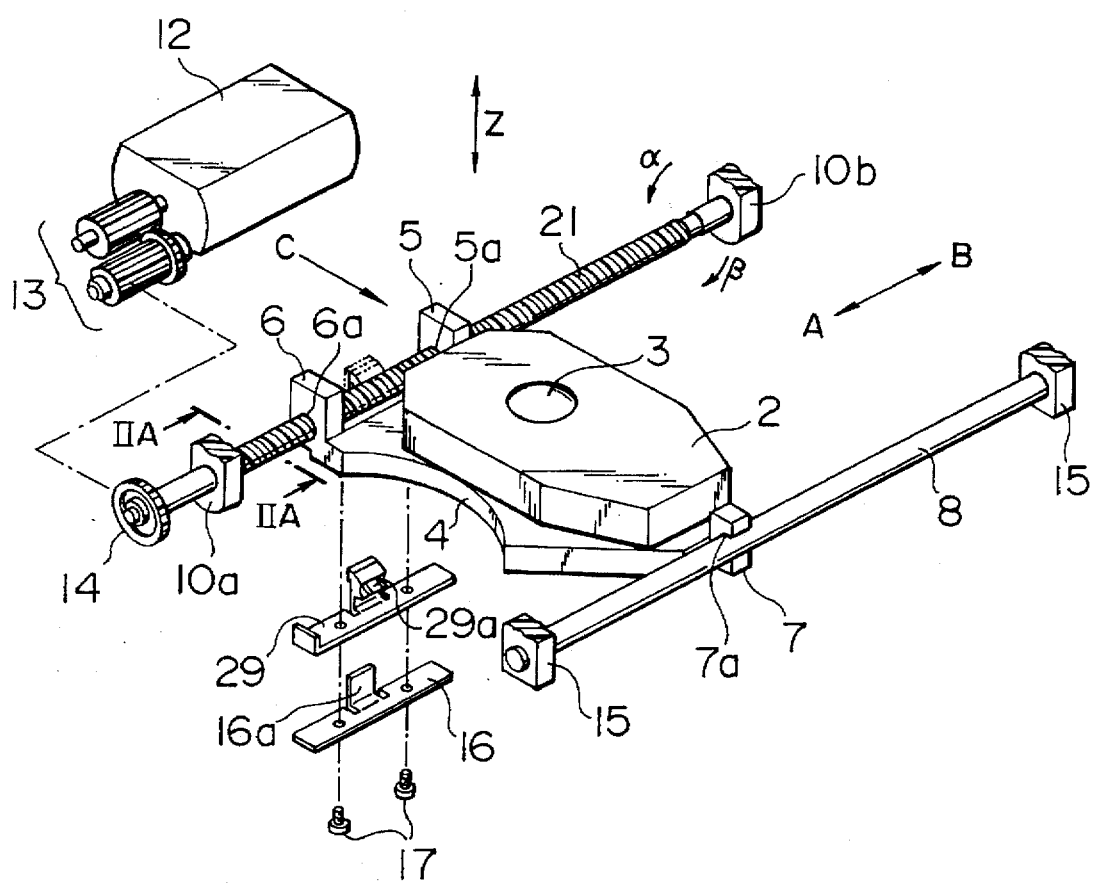
FIG. 1 is a perspective view showing a head feeding device according to the present invention.

Referring to the drawings, the present invention will hereinafter be described more in detail.

Figure 4:
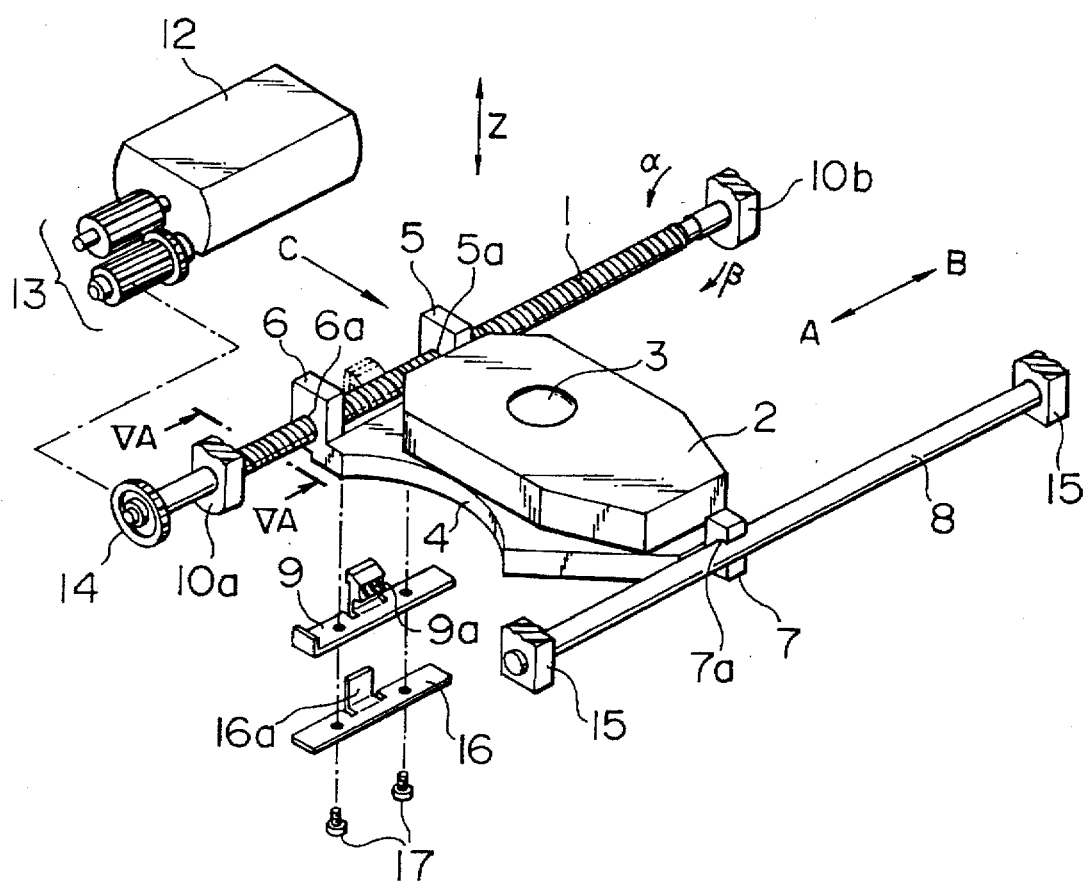
FIG. 4 is a perspective view showing a second conventional head feeding device.

The head feeding device of the present invention has the same general construction as that of the second conventional device shown in FIG. 4. However, a screw shaft and engagement member of the device according to the present invention differ from those of the second conventional device.

Referring to FIG. 1, an optical head 2 with an objective lens 3 is mounted on a head base 4. The head base 4 is provided with shaft bearings 5, 6 having bearing holes 5a, 6a on one side of the optical head 2, and a shaft bearing 7 having a U-shaped recess 7a on the other side of the optical head 2. A screw shaft 21 is inserted through the bearing holes 5a, 6a, and a guide shaft 8 is engaged in the U-shaped recess 7a. The head base 4 is movable on the screw shaft 21 and guide shaft 8 in the (A)—(B) direction, and a small amount of play is provided between the U-shaped recess 7a and the guide shaft 8. Therefore, the optical head 2 is guided in the (A)—(B) direction with the screw shaft 21 serving as a reference.

The guide shaft 8 is supported by shaft supporting members 15, 15 at both ends thereof, and the screw shaft 21 is rotatably supported by shaft bearing members 10a, 10b. The screw shaft 21 is provided with a follower gear 14, to which the turning force of a tracking motor 12 is transmitted via a reduction gear train 13, thereby driving the screw shaft 21 to rotate in the α or β directions.

An engagement member 29 is attached to a lower portion of the head base 4 between the shaft bearings 5, 6 by means of a supporting flat spring 16 and screws 17, 17. The engagement member 29 has an external thread 29a formed thereon. The flat spring 16 has a pressing part 16a, by which the engagement member 29 is elastically pressed in the C direction toward the screw shaft 21 such that the external thread 29a engages in a continuous thread groove 21b (see FIG. 2B) of the screw shaft 21.

As the screw shaft 21 rotates, the head base 4 and the optical head 2 moves in the (A)—(B) direction. An information bearing surface of an optical disk is placed above and facing the optical head 2. As the optical disk turns and the optical head moves in the direction (B), detecting beams emitted from the objective lens 3 searches the recorded surface of the optical disk, thus reading signals recorded on the optical disk.

Figure 2A:
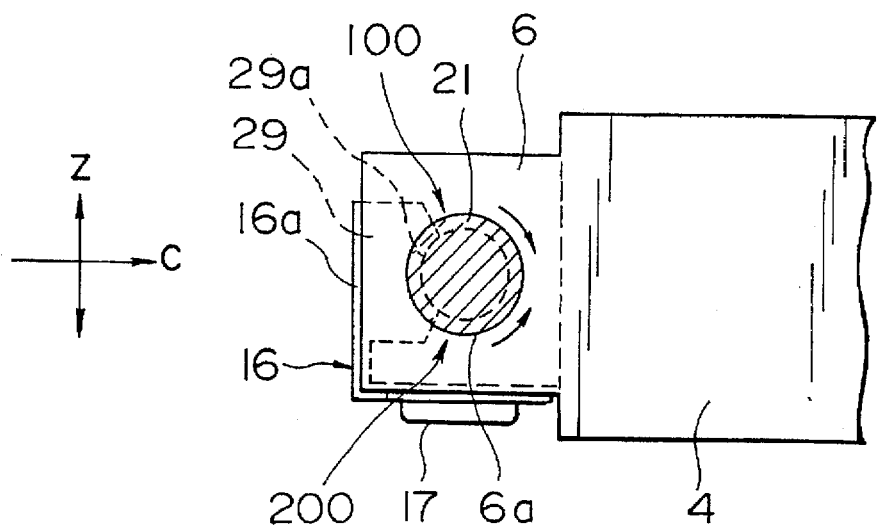
FIGS. 2A and 2B illustrate a shaft bearing of the head feeding device shown in FIG. 1, where
Figure 2B:
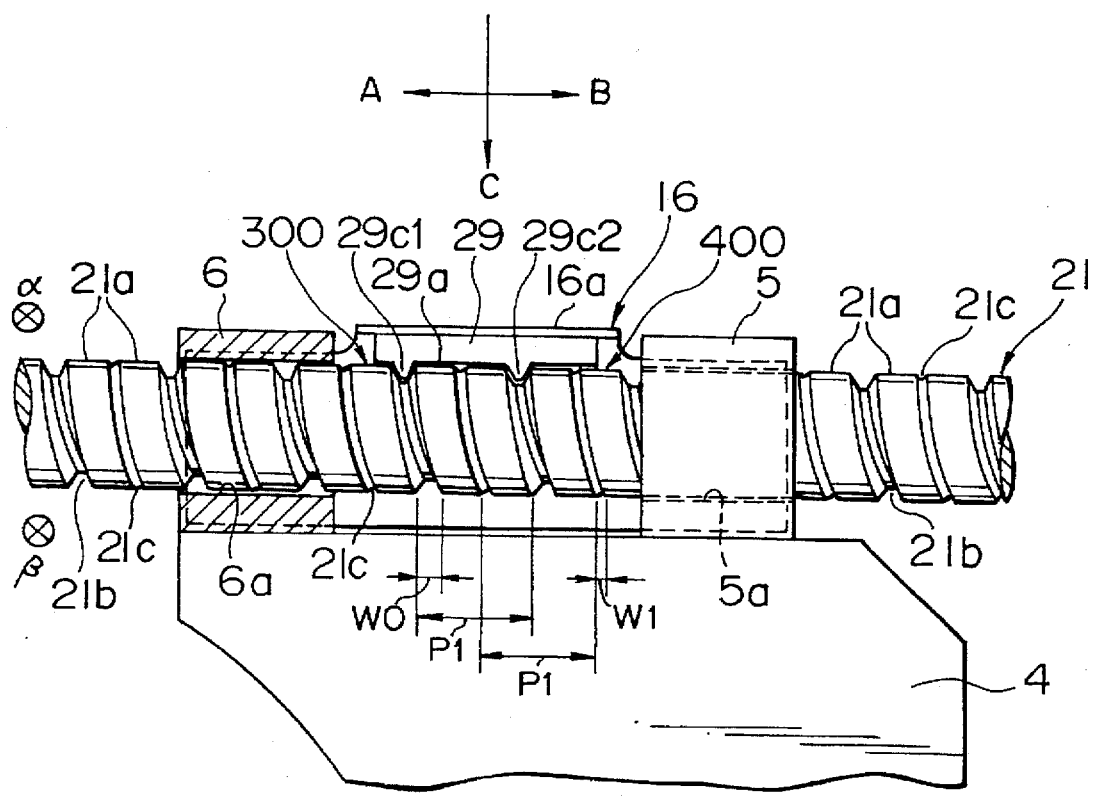
Figure 3:
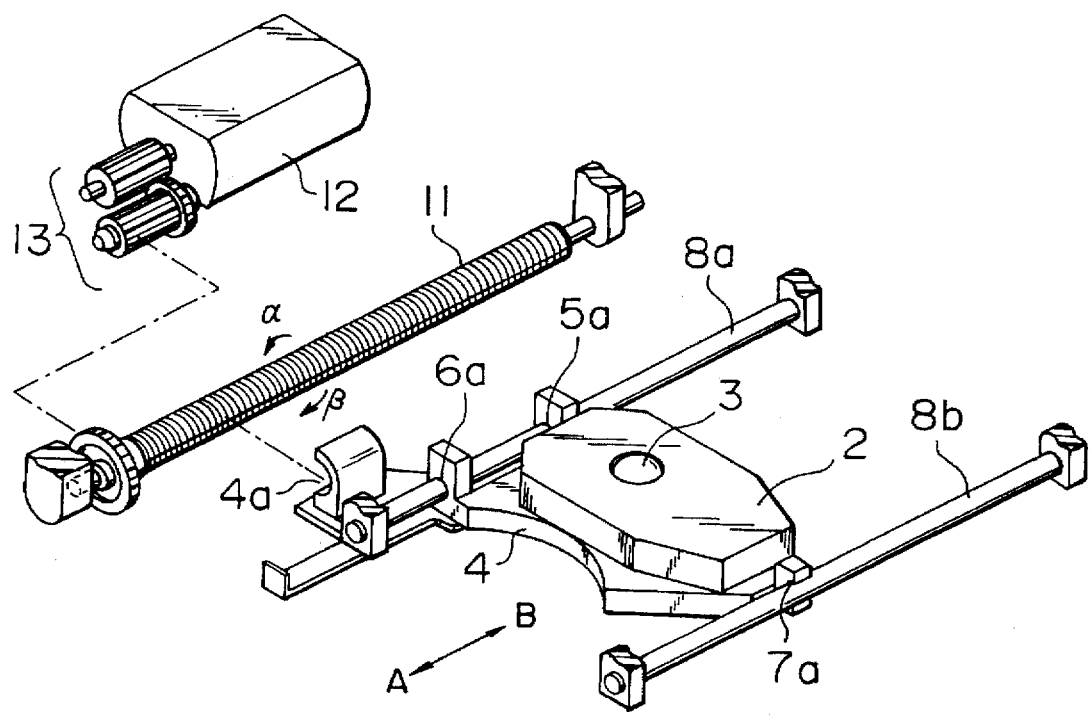
FIG. 3 is a perspective view showing a first conventional head feeding device.

As shown in FIG. 2B, the continuous spiral (helical) thread groove 21b is formed in (cut into) a guidance (outer) surface 21a of the screw shaft 21. In addition to the continuous thread groove 21b, a (second) continuous spiral (helical) groove 21c for containing a lubricant is formed in the guidance surface 21a such that a portion of the groove 21c is positioned between adjacent portions of the thread groove 21b.

The pitch P1 of the thread groove 21b is identical to the pitch P1 of the groove 21c for containing a lubricant, and the thread groove 21b and the groove 21c form so called a double-start thread (or double-threaded screw).

However, a groove width W1 of the groove 21c for containing a lubricant (measured in an axial direction of the screw shaft 21) is smaller than a groove width W0 of the thread groove, and a groove depth of the groove 21c (measured in a radial direction of the screw shaft 21) is smaller than that of the thread groove 21b. Because the groove width W1 of the groove 21c for containing a lubricant is a smaller that the groove width W0, the groove width W1 occupies a small area of the guidance surface 21a interposed between adjacent portions of the thread 21b. Therefore, the area of contact (boundary) between the guidance surface 21a and the inner surface of the bearing holes 5a, 6a is larger than a case in which the groove width W0 of the thread groove 21b is equal to the groove width W1 of the groove for containing lubricant 21c.

As shown in FIG. 2B, the engagement member 29 includes an external thread 29a upon which are formed projections 29c1 and 29c2. The projections 29c1 and 29c2 are formed with the same pitch as the pitch P1 of the thread groove 21b, and the sectional shape of the projections 29c1 and 29c2 is analogous to that of the thread groove 21b, and both are shown as trapezoidal in the embodiment disclosed in FIG. 2B. The projections 29c1 and 29c2 engage in the thread groove 21b of the screw shaft 21, but do not engage in the groove 21c for containing a lubricant.

A turning force provided by the tracking motor 12 is decelerated by the reduction gear train 13 and transmitted to the follower gear 14. As the screw shaft 21 makes one turn, the external thread 29a of the engagement member 29 is moved by one pitch P1, thereby giving a feeding force with a specific speed to the head base 4. Consequently, the head base 4 slides on the guidance surface 21a of the surface of the screw shaft 21, moving the optical head 2 in the (A)—(B) direction.

Figure 5A:
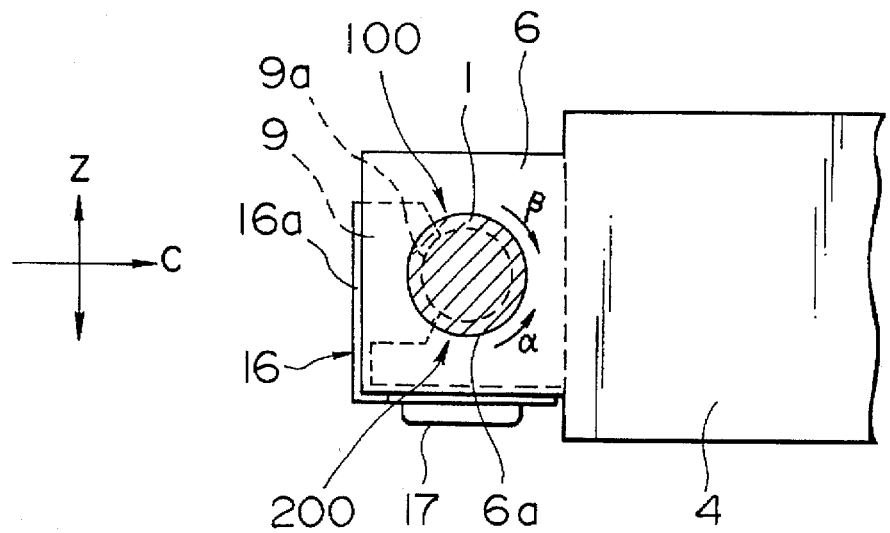
FIGS. 5A and 5B illustrate a shaft bearing of the head feeding device shown in FIG. 4, where
Figure 5B:
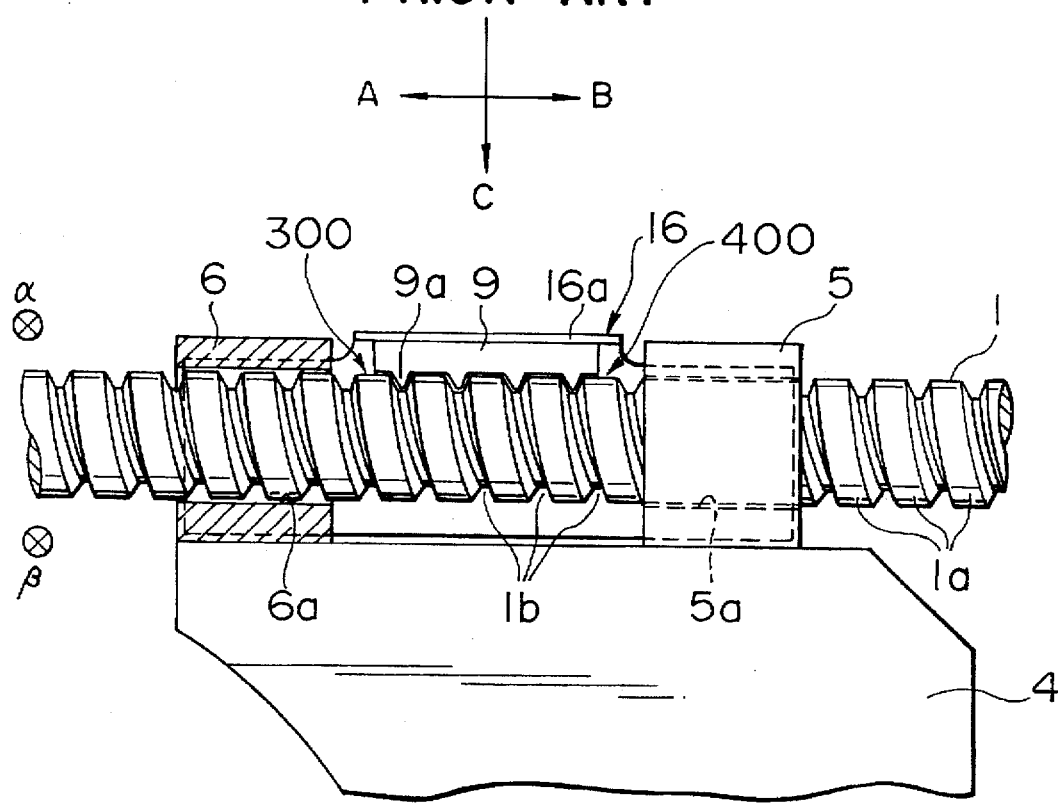

When a lubricant, such as grease, is applied on the surface of the screw shaft 21, the lubricant collects in the thread groove 21b. During rotation of the screw shaft 21, the projections 29c1 and 29c2 of the external thread 29a rake (scrape) the lubricant out of the thread groove 21b such that it collects in at the locations designated by reference numerals 100 or 200, and 300 or 400 in the same manner as the conventional device shown in FIG. 5A and 5B. However, because the projections 29c1 and 29c2 do not enter the groove 21c, the lubricant contained in the groove 21c is not raked out. Therefore, the lubricant is always supplied between the guidance surface 21a and the inner surface of the bearing holes 5a, 6a so as to be appropriately lubricated between the guidance surface 21a and the inner surface of the bearing holes 5a, 6a. Therefore, the head base 4 will be guided smoothly without significant friction or seizure.

Moreover, the groove width W1 of the groove 21c is sized so as to be sufficient to contain a lubricant and not larger than is needed; and therefore, the area of the guidance surface 21a sliding on the inner surface of the bearing holes 5a, 6a remains wide and the head base 4 is guided stably.

Another embodiment of the present invention uses a screw shaft 21 with a double-start thread in which the thread groove 21b and the groove 21c for containing a lubricant have identical widths and depths. In this case, the thread groove 21b is used for engaging with the external thread 29a, and the other groove 21c is used only for supplying a lubricant. However, this embodiment widens the groove 21c for containing lubricant, thereby providing a narrower area for the guidance surface 21a. This reduces the slide and contact area with the bearing holes 5a, 6a, and is therefore less preferable to the construction shown in FIGS. 2A and 2B.

Moreover, because the thread groove 21b and the groove 21c for containing a lubricant are made with the same pitch P1, it is possible to use a thread forming method wherein two cutting tools are located on opposite sides of the shaft. The first cutting tool presses the shaft 21 to cut one thread of the groove on one side and the second cutting tool presses the shaft 21 to cut the other thread on the opposite side while the shaft is turning. Because the pressures applied by the cutting tools against the shaft 21 are applied evenly from opposite sides using this method, bending of the shaft is avoided during the thread cutting process, thereby producing a screw shaft 21 with a higher degree of straightness than that produced by the conventional, single thread devices. Therefore, the screw shaft 21 provides improved guidance accuracy of the optical head 2 over the conventional devices embodiments.

Further, recently-produced CD-ROM drive apparatus require a high-speed search capability which is, for example, two to four times the speed of a compact disk player, so that the pitch P1 of the thread groove 21b is necessarily larger. The construction of the head feeding device according to the present invention enhances an efficiency in lubricating the shaft bearing and the screw shaft, and improves the straightness of the screw shaft, so that it will be suitable for the above-mentioned high-speed search.

Further, when the pitch of the thread groove of the screw shaft becomes wide, two or more threads can be formed for containing a lubricant.

In the head feeding device to guide a head on the surface of the screw shaft, the construction according to the present invention effectively lubricates the shaft bearing during sliding on the screw shaft. In addition, it improves the straightness of the screw shaft and achieves a stable guidance of the head, and it is also applicable to a high-speed searching apparatus.

While specific embodiments of the present invention have been illustrated and described herein, it is understood that numerous modifications and changes will occur to those skilled in the art. It is therefore to be understood that the appended claims are intended to cover all such modifications and changes as fall within the true spirit and scope of the invention.

What is claimed is:

1. A head feeding device for feeding a head in a disk drive apparatus such that the head is positioned adjacent a desired portion of an information bearing disk, the head feeding device comprising:
   a screw shaft having an axis aligned in an axial direction, an outer surface, and a continuous thread groove formed in the outer surface, the thread groove having a predetermined pitch,
   a driver connected to the screw shaft for turning the screw shaft around the axis,
   a head structure for supporting said head, said head structure including:
      a shaft bearing slidably mounted on the outer surface of the screw shaft such that the head structure is guided along the axial direction, and
      an engagement member engaged in the thread groove such that rotation of the screw shaft around the axis causes movement of the head structure along the axis;
   wherein at least one groove for containing a lubricant is formed in the outer surface of the screw shaft such that a segment of said at least one groove is located between first and second segments of the thread groove.

2. A head feeding device as set forth in claim 1, wherein a width of said at least one groove is narrower than a width of the thread groove.

3. A head feeding device as set forth in claim 1, wherein a pitch of said at least one groove is equal to a pitch of the thread groove.

4. A head feeding device as set forth in claim 1, wherein the head structure includes first and second shaft bearings which are spaced apart along the axial direction of the screw shaft, and wherein the engagement member is located between the first and second shaft bearings.

5. A head feeding device as set forth in claim 1, wherein the engagement member includes an external thread which engages the thread groove, but does not engage said at least one groove, such that rotation of the screw shaft around the axis applies an force to the external thread, thereby causing movement of the head structure along the axis.

6. A head feeding device as set forth in claim 1, wherein the engagement member is elastically supported on the head structure by a spring member which elastically presses the engagement member against the screw shaft to engage in the thread groove.

7. A head feeding device as set forth in claim 1, wherein the head structure includes a head base upon which the head is mounted.

8. A head feeding device for feeding a head in a disk drive apparatus such that the head is positioned adjacent a desired portion of an information bearing disk, the head feeding device comprising:
   a screw shaft having an axis aligned in an axial direction, an outer surface, and a continuous thread groove formed in the outer surface, the thread groove having a predetermined pitch,
   a driver connected to the screw shaft for turning the screw shaft around the axis,
   a head base upon which said head is mounted, said head base including:
      a shaft bearing slidably mounted on the outer surface of the screw shaft such that the head base is guided along the axial direction, and
      an engagement member engaged in the thread groove such that rotation of the screw shaft around the axis causes movement of the head base along the axis;

wherein, at least one groove for containing a lubricant is formed in the outer surface of the screw shaft such that a segment of said at least one groove is located between first and second segments of the thread groove, and wherein a width of said at least one groove is narrower than a width of the thread groove.

9. A head feeding device as set forth in claim 8, wherein a pitch of said at least one groove is equal to a pitch of the thread groove.

10. A head feeding device as set forth in claim 8, wherein the head base includes first and second shaft bearings which are spaced apart along the axial direction of the screw shaft, and wherein the engagement member is located between the first and second shaft bearings.

11. A head feeding device as set forth in claim 8, wherein the engagement member includes an external thread which engages the thread groove, but does not engage said at least one groove, such that rotation of the screw shaft around the axis applies an force to the external thread, thereby causing movement of the head base along the axis.

12. A head feeding device as set forth in claim 8, wherein the engagement member is elastically supported on the head base by a spring member which elastically presses the engagement member against the screw shaft to engage in the thread groove.

13. A head feeding device for feeding a head in a disk drive apparatus such that the head is positioned adjacent a desired portion of an information bearing disk, the head feeding device comprising:

a screw shaft having an axis aligned in an axial direction, an outer surface, and a continuous thread groove formed in the outer surface, the thread groove having a predetermined pitch, a driver connected to the screw shaft for turning the screw shaft around the axis, a head base upon which said head is mounted, said head base including:

a shaft bearing slidably mounted on the outer surface of the screw shaft such that the head base is guided along the axial direction, and an engagement member engaged in the thread groove such that rotation of the screw shaft around the axis causes movement of the head base along the axis;

wherein, at least one groove for containing a lubricant is formed in the outer surface of the screw shaft such that a segment of said at least one groove is located between first and second segments of the thread groove, and wherein the engagement member includes an external thread which engages the thread groove, but does not engage said at least one groove, such that rotation of the screw shaft around the axis applies an force to the external thread, thereby causing movement of the head base along the axis.

14. A head feeding device as set forth in claim 13, wherein a width of said at least one groove is narrower than a width of the thread groove.

15. A head feeding device as set forth in claim 13, wherein a pitch of said at least one groove is equal to a pitch of the thread groove.

16. A head feeding device as set forth in claim 13, wherein the head base includes first and second shaft bearings which are spaced apart along the axial direction of the screw shaft, and wherein the engagement member is located between the first and second shaft bearings.

17. A head feeding device as set forth in claim 13, wherein the engagement member is elastically supported on the head base by a spring member which elastically presses the engagement member against the screw shaft to engage in the thread groove.

* * * * *